United States Patent

[11] 3,619,649

[72] Inventor Melvin R. Hoffman
New York, N.Y.

[21] Appl. No. 827,802
[22] Filed May 26, 1969
[45] Patented Nov. 9, 1971
[73] Assignee The Western Union Telegraph Company
New York, N.Y.

[54] SLOW-SPEED BOOTSTRAP SWEEP CIRCUIT
7 Claims, 2 Drawing Figs.

[52] U.S. Cl. .......... 307/228, 307/246, 307/318, 328/183, 328/184
[51] Int. Cl. .......... H03k 4/24
[50] Field of Search .......... 307/228, 246, 318; 328/183, 184

[56] References Cited

UNITED STATES PATENTS

| | | | |
|---|---|---|---|
| 2,716,729 | 8/1955 | Shockely | 307/318 X |
| 2,998,532 | 8/1961 | Smeltzer | 307/228 |
| 3,192,408 | 6/1965 | Yohan | 328/183 |
| 3,302,040 | 1/1967 | Dryden | 307/228 |
| 3,393,325 | 7/1968 | Borror et al. | 307/246 X |

*Primary Examiner*—Donald D. Forrer
*Assistant Examiner*—R. C. Woodbridge
*Attorney*—Michael I. Borsella

ABSTRACT: A bootstrap sweep circuit generates slow-speed sweeps of approximately 150 milliseconds or longer, with ramps having good linearity and short recovery time. A transistor and two zener diodes are employed to generate a stable sweep voltage during the sweep cycle regardless of temperature variations. A square top gating pulse spaces the successive linear ramps which are sharply saw-toothed.

INVENTOR
MELVIN R. HOFFMAN
BY J. B. Burke
ATTORNEY.

SLOW-SPEED BOOTSTRAP SWEEP CIRCUIT

The invention concerns a bootstrap sweep circuit operating at relatively low speeds of approximately 150 milliseconds or longer.

Bootstrap sweep circuits have heretofore been generally known and used in the electronics arts. Typical circuits of this type are described in chapter 14 of "Pulse, Digital and Switching Waveforms" by Millman and Taub, published by McGraw-Hill, N.Y. 1965. In general a bootstrap circuit used to produce low speed sweeps as above mentioned, must develop a timing voltage which is constant over the sweep range. The ramps should have good linearity and the retrace time should be substantially instantaneous or very short.

The prior bootstrap circuits have generally employed a charged capacitor or a Zener diode to develop the timing voltage. When a capacitor is used, capacitors of excessively large size and capacitance are required, and even these will not prove satisfactory because such capacitors have excessive leakage currents which do not permit generation of slow speed linear sweeps. Capacitors used in this way lose their charge during the sweep cycle and require a long recharge time, thereby precluding the possibility of a short retrace time. Where a Zener diode has previously been used in a bootstrap circuit, the current passing through the Zener diode varies as the sweep is generated resulting in a change in the timing voltage and causing nonlinearity in the ramps. The circuitry used to bias the Zener diode lowers the normally high input impedance of the associated amplifier causing further nonlinearity.

The present invention avoids the difficulties and disadvantages of prior bootstrap circuits by an arrangement of Zener diodes, transistor, and amplifier of high input impedance, in such a way that constant timing voltage is obtained, the high input impedance of the amplifier is properly matched, the ramps have good linearity and the sweep retrace times are very short.

The invention will be explained in further detail in connection with the drawing, wherein.

Figures 1, 2:
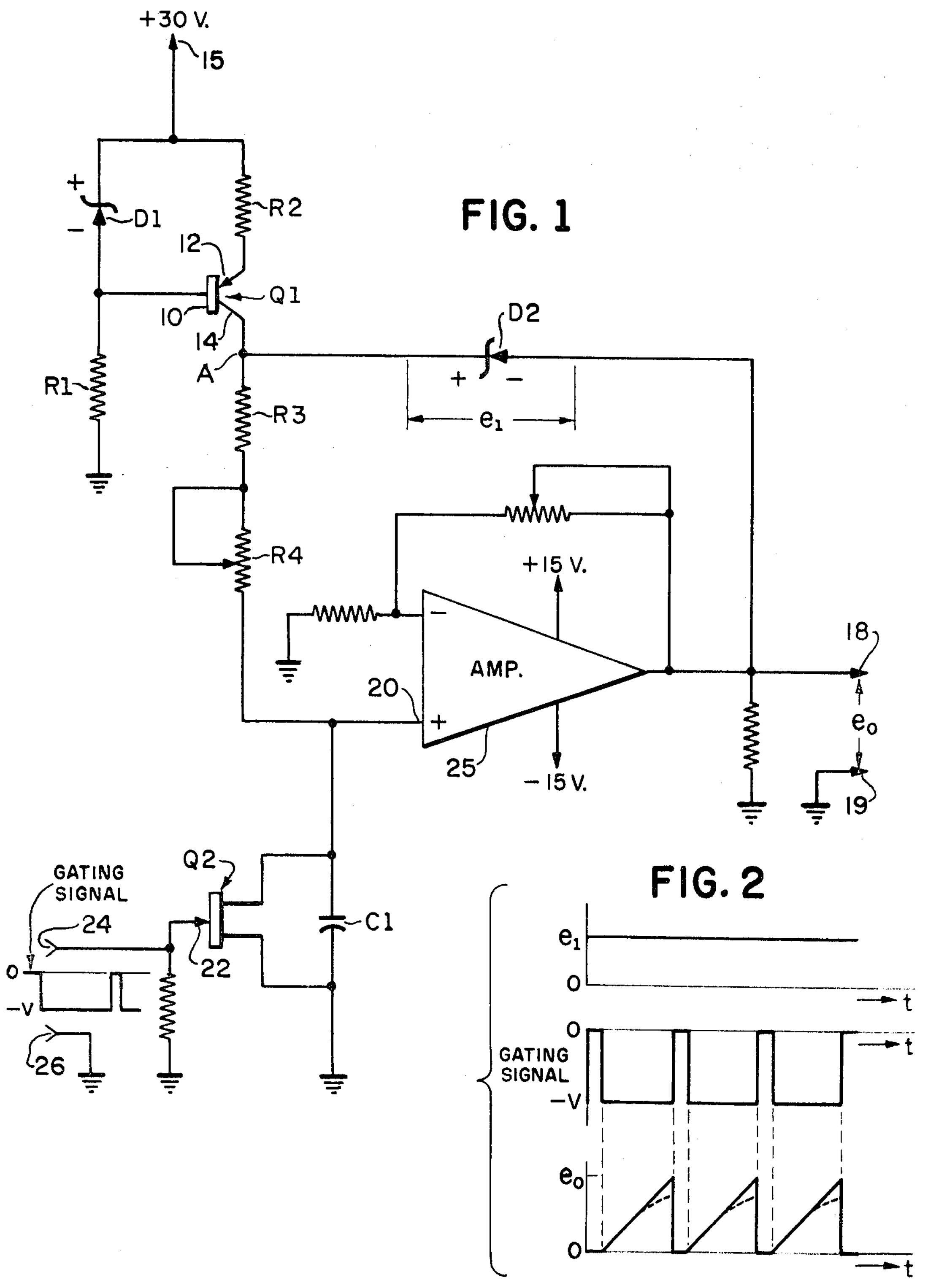
FIG. 1 is a diagram of a slow speed bootstrap sweep circuit embodying the invention.
FIG. 2 is a graphical diagram used in explaining the invention.

Referring to FIG. 1, transistor Q1 has its base 10 connected to Zener diode D1, its emitter 12 connected via resistor R2 to the positive terminal 15 of a DC voltage source, and its collector 14 connected to point A. Resistor R1 is connected to the Zener diode and base 10. Transistor Q1 is biased by the Zener diode D1 and resistors R1,R2 and is used as a constant current source to feed Zener diode D2 connected to point A. Output terminal 18 is connected to Zener diode D2. It is important that the potential between point A and ground be greater than the sum of the output voltage $e_0$ appearing between terminals 18,19 and the voltage drop $e_1$ appearing across Zener diode D2. This will insure that this Zener diode will operate in its Zener region. If this is the case, collector current from transistor Q1 will flow through Zener diode D2 rather than through resistors R3 and R4, because the impedance of the diode is considerably lower than that of resistors R3 and R4. Resistors R3 and R4 are connected in series between point A and input terminal 20 of amplifier 25.

Diode D2 is a temperature compensated Zener diode whose temperature coefficient depends on the current flowing through it. Resistors R1,R2 and Zener diode D1 adjust the collector current of transistor Q1 so that the desired current through diode D2 is obtained. To insure maximum temperature stability of the collector current of transistor Q1, the temperature coefficient of Zener diode D1 cancels the temperature variation of the base-to-emitter voltage drop of transistor Q1.

Transistor Q2 is a field effect transistor which has a low resistance when conducting. This transistor has its output connected across capacitor C1 and between amplifier input terminal 20 and ground. Negative gating signal pulses (−V) are applied to the input gate 22 of transistor Q2 via circuit input terminals 24,26; see FIG. 2. If no voltage is applied to the gate 22 of transistor Q2, the field effect transistor is on, its resistance is low and this shorts out capacitor C1. Thus the input to amplifier 25 is zero and the output of the amplifier applied to across terminals 18,19 is zero volts. At this time, the current through resistors R3 and R4 is determined by the voltage $e_1$ across diode D2.

Amplifier 25 is a unity gain, noninverting amplifier. In this mode of operation, the input impedance of the amplifier is extremely high. It is important that the input impedance of the amplifier be high in order to achieve good sweep linearity.

The operation of the circuit begins when a negative voltage which is large enough to cut off transistor Q2 is applied to gate 22 of the transistor. When the field effect transistor Q2 is turned off, its output impedance is extremely high so that the current through resistors R3 and R4 starts to charge up capacitor C1. As the voltage across capacitor C1 rises, the output of the amplifier follows it. As a result the voltage drop across resistors R3 and R4 remains constant and is determined by the voltage $e_1$ of diode D2; see FIG. 2. This means that the charging current of capacitor remains constant. When this situation occurs, the voltage across the capacitor will rise linearly. Since the amplifier is a unity gain device with a low impedance output, a slow speed linear sweep $e_0$ will appear at the output of the amplifier.

When it is desired to terminate the sweep, the input voltage to transistor Q2 is set to zero so that its output impedance is a low resistance. As a result capacitor C1 discharges rapidly through transistor Q2 and the sweep drops sharply to zero. The sweep rate of the circuit is determined by the magnitude of capacitor C1 and resistors R3,R4.

The sawtooth waveshape of sweep voltage $e_0$ is shown by solid lines in FIG. 2. The sweeps drop sharply to zero at the end of each sweep, i.e., when the gating signal returns to zero. The ramps are substantially straight. The dotted lines adjacent the ramps indicate the loss in linearity encountered with prior bootstrap circuits where large charging capacitors or Zener diodes passing variable currents are employed.

What is claimed is:

1. A bootstrap sweep circuit for generating a cyclic waveform having substantially linear ramps at least as long as 150 milliseconds and terminating in substantially instantaneous drops to zero, comprising a transistor; a first Zener diode connected to the transistor and biasing the transistor to pass a current of constant magnitude; a second Zener diode connected to the transistor to receive said constant current, said current through said second Zener diode is maintained constant to remove fluctuations in the current and voltage through said second Zener diode due to the slope of the breakdown curve of said second Zener diode to generate a voltage of constant magnitude across said second Zener diode; and amplifier having an input including a pair of input terminals and an output means connecting the second Zener diode to the amplifier output; a source of gating pulses including a capacitor coupled with the amplifier across the input terminals thereof; and means connecting the transistor, second Zener diode and a first input terminal of the amplifier to a common junction point, whereby the waveform appearing at the amplifier output rises linearly during intervals when the gating pulses have maximum voltage and the waveform drops sharply to zero when the gating pulses drop to zero.

2. A bootstrap sweep circuit as defined in claim 1, further comprising a DC voltage source; means connecting the transistor and first Zener diode to said DC voltage source; first resistor means connected between the transistor and ground; and second resistor means connected between the transistor and said DC voltage source, whereby the transistor is biased by the first Zener diode and both of the resistor means to pass said current of constant magnitude.

3. A bootstrap sweep circuit as defined by claim 2, further comprising third resistor means connected between said junction point and said first amplifier input terminal, said second Zener diode having a smaller impedance than said third resistor means, whereby current from the transistor will flow through the second Zener diode rather than the third resistor means when the potential between said common junction point and ground is greater than the sum of the output voltage at said amplifier output and the voltage across the second Zener diode.

4. A bootstrap sweep circuit as defined by claim 3, wherein the transistor has a base, emitter and collector, said second Zener diode having a temperature coefficient which depends on current flowing through it, said first and second resistors and first Zener diode adjusting the collector current of the transistor so that a desired current through the second Zener diode is obtained.

5. A bootstrap sweep circuit as defined by claim 4, wherein the first Zener diode has such a temperature coefficient that it cancels variations of voltage between the base and emitter of the transistor caused by changes in its temperature.

6. A bootstrap sweep circuit as defined by claim 2, wherein the amplifier is a unity gain, noninverting amplifier having a high input impedance and low output impedance, so that the ramps of said waveform are substantially linear.

7. A bootstrap sweep circuit as defined by claim 6, wherein said source of gating pulses further comprises a field effect transistor having an input and output, the output of the field effect transistor being connected across said amplifier input terminals, whereby the field effect transistor is cut off when a sufficiently large negative voltage is applied to the input of the field effect transistor, whereby said capacitor is charged by a constant charging current, whereby the voltage at the output of the amplifier rises linearly, and whereby the capacitor discharges rapidly through the field effect transistor when the gating pulses return to zero to cause the voltage at the output of the amplifier to drop sharply to zero.

* * * * *